May 6, 1941.  T. E. NEAR ET AL  2,241,267
HOSE SUPPORTER
Filed Aug. 21, 1939

INVENTOR.
ETHEL SHERLOCK.
THOMAS E. NEAR.
BY
Thos. Donnelly
ATTORNEY.

Patented May 6, 1941

2,241,267

UNITED STATES PATENT OFFICE 2,241,267

HOSE SUPPORTER

Thomas E. Near and Ethel Sherlock, Detroit, Mich.

Application August 21, 1939, Serial No. 291,194

6 Claims. (Cl. 241—1)

Our invention relates to a new and useful improvement in a hose supporter adapted primarily for use in supporting women's stockings, the present invention forming in part a continuation of our application, Serial Number 245,711, filed December 11, 1938.

A difficulty commonly encountered in supporting stockings is the sagging of the stocking at the knee when a person sits down or assumes a bent-knee position. This is noticeable whether the hose are attached to hose fastening supports depending from a garment or whether the hose is engaged by a garter of the elastic type which encircles the leg of the wearer. The difficulty, however, is not so prevalent when the hose are attached to hose supporters depending from a garment. Experience has shown that with hose supporters depending from a garter which encircles the leg, the difficulty may be overcome if the slipping of the garter downwardly on the upper part of the leg can be prevented and it is an object of the present invention to provide a garter so arranged and constructed that it may encircle the leg above the knee and securely grip it so that strains delivered to it through a stocking fastened to hose supporters attached thereto will be resisted by the lining of the encircling band on the leg.

Another object of the invention is the provision of a hose supporter embodying a band adapted for encircling the leg, so arranged and constructed that when stretched into position on the leg it will have a tendency to curl about about its longitudinal medial line to securely grip the leg and prevent slippage.

Another object of the invention is the provision of a hose supporter so arranged and constructed that the edges thereof will cooperate with suction cups positioned inwardly of the edges to grip the leg of the wearer.

Another object of the invention is the provision of a hose supporter embodying a leg-encircling band having an outer layer of elastic webbing carrying inner layers of rubber and provided, between a pair of said layers, with elastic cords.

Other objects will appear hereinafter.

Figure 1:
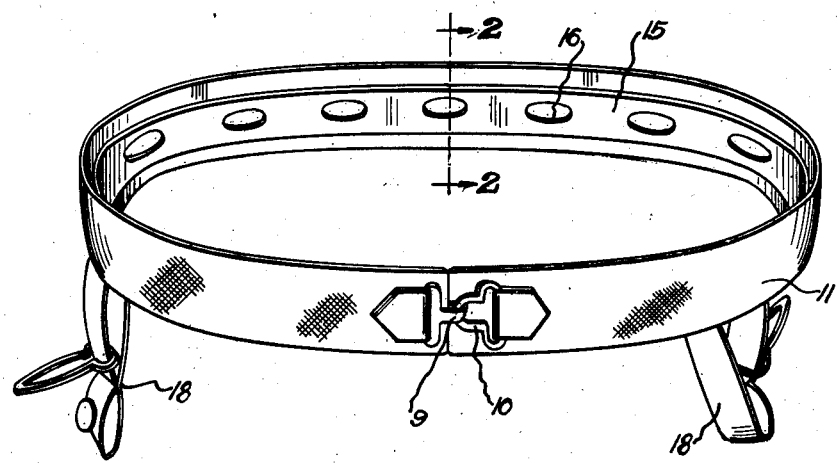
Fig. 1 is a perspective view of the invention.
Figure 2:
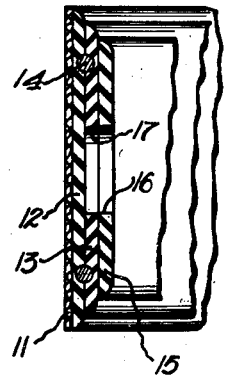
Fig. 2 is an enlarged, fragmentary, sectional view taken on line 2—2 of Fig. 1.
Figure 3:
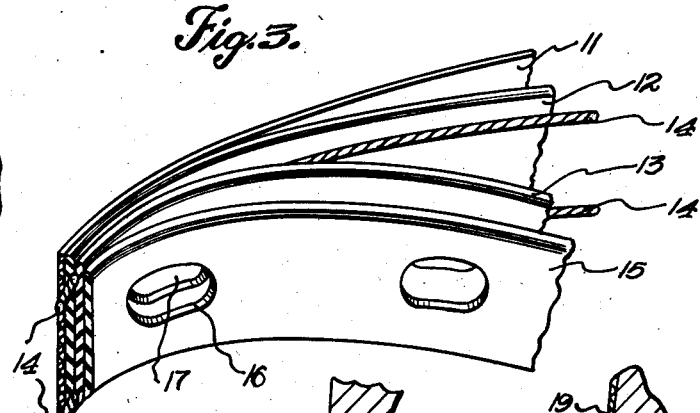
Fig. 3 is a slightly enlarged perspective view of a fragment of the invention showing the various parts in separated relation.

In the drawing we have illustrated the invention as embodying a split band having the ends held in engagement by means of the hook 9 and the eye 10. Other types of fastening may be resorted to and, from the description which follows, it will appear evident that the invention may, if desired, be formed into an uninterrupted loop which may be slipped over the foot of the wearer and drawn upwardly over the thigh. The structure is provided with an outer layer 11 of elastic webbing and secured to the inner face of this elastic webbing by vulcanizing or adhesion is a layer 12 of rubber, preferably in partially cured condition so that it is provided with elasticity and at the same time an adhesive quality which will act, when brought into contact with a layer of the same kind of rubber, to bond or adhesively secure the two layers together. An intermediate layer 13 of rubber in its partially cured state is secured by adhesion or bonding to the inner face of the layer 12, the layer 13 being of slightly narrower width than the layer 12. Positioned between these layers 12 and 13 are elastic cords 14, the core of which consists of fully cured rubber. Secured to the inner face of the layer 13 by adhesion or bonding is a layer 15 of partially cured rubber which is of slightly narrower width than the layer 13. After these layers have been placed in position as shown in Fig. 2, the edges thereof are rolled to provide an inclined edge so that the edge of the inner layer of rubber tapers toward the contacting outer layer, while the outermost layer of rubber tapers toward the contacting and supporting layer of elastic band. Formed in each of the layers 13 and 15 are elongated openings 16 and 17 which are in registration and which form, when the article is in use, vacuum cups for gripping the flesh of the leg or thigh on which mounted so as to prevent slipping. Secured to the structure and depending therefrom are hose fasteners 18. Also, if desired, these may be dispensed with and the encircling band used for engaging the stocking in the manner of the well-known circular garter. The device may also be used to engage throughout a portion of its width with the stocking 19 and throughout the remaining portion of its width with the flesh of the leg or thigh as clearly illustrated in Fig. 6. The construction is such that the edge surfaces 20 and 21 are substantially uninterrupted surfaces, the end faces of the various layers lying substantially flush with each other.

Figure 4:
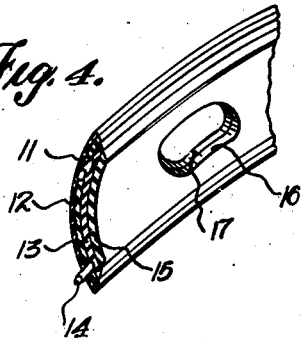
Fig. 4 is a slightly enlarged fragmentary, perspective view of the invention showing it in stretched form.

In Fig. 4, we have illustrated a function which takes place when the garment is stretched and it is to be noted that the garment when placed on the leg or the thigh of the wearer would normally be in a stretched position so as to maintain the encircling band taut about the leg or thigh. When the structure is stretched, due, it is believed, to the combination of the layers of rubber and the layer of elastic webbing, the band tends to assume a circular form in cross section as shown in Fig. 4. This is due largely, it is believed, to the fact that when the elastic webbing is stretched, it maintains substantially its original width; whereas when the rubber layers are stretched they narrow considerably. The rubber layers being attached to the webbing will, therefore, cause the webbing to curl or bend inwardly at its opposite longitudinal edges to assume the curvilinear formation illustrated in Fig. 4 and Fig. 5. Thus, when placed on the leg or thigh 22 of the wearer, the opposite longitudinal edges of the device are bent inwardly into engagement with the surface of the leg or thigh 22, tending to embed the garter in the leg or thigh.

Figures 5, 6:
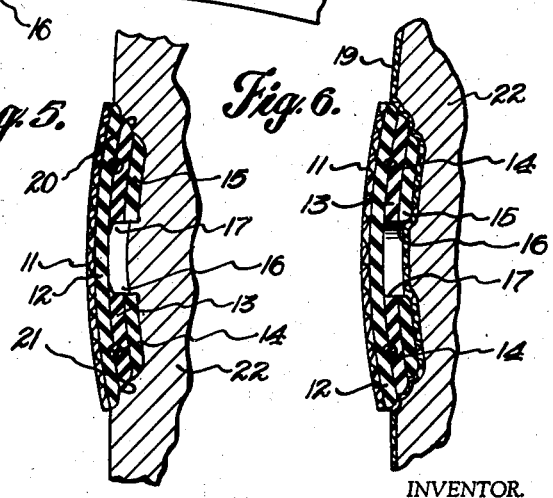
Fig. 5 is an enlarged transverse, sectional view showing the invention applied in use.
Fig. 6 is a fragmentary, sectional view showing the invention applied and used in a slightly modified manner.

In Fig. 5, we have illustrated the application of the device in enlarged form and considerably exaggerated the embedding of the band in the flesh of the leg or thigh 22. The flesh of the leg or thigh 22 also flows into the cups formed in the openings and any attempted movement of the encircling band on the leg or thigh while in pressing relation thereto will cause these cups to act as vacuum cups for resisting such movement.

Experience has shown that frequently, depending to some extent upon the condition of the rubber used to provide the layers 12, 13 and 15, excessive curling of the encircling band would take effect and in order to prevent this, the elastic cords 14 have been embedded adjacent opposite edges of the band on opposite sides of the medial line thereof. Experience has also shown that the use of these cords, located and mounted as described, tends to lend greater life to the band.

The hose supporters or fasteners 18 may be made from elastic material or from non-elastic material as desired, these hose supporters being commonly made of either type of material. When formed from elastic material and attached to a stocking above the knee, the bending of the knee will transmit additional strain to the hose fastener, and being made of elastic, this fastener will yield under the strain to compensate for the shortening due to the bending of the knee. When the leg is again straightened out, the elastic supporter will return to its normal position retaining the stocking taut and preventing bagging or wrinkling about the knees. In this function, the elastic encircling band would cooperate with the elastic fastener 18 and the band also would be stretched somewhat downwardly of the thigh. This movement, however, would be a movement in the band itself and not a movement of the band along the thigh or leg, due to the fact that the longitudinal movement of the band along the leg while stretched thereon is, under such strains, impossible and due partly to the curling tendency of the band itself.

If the fasteners 18 are made from non-elastic material, the supporter will serve to prevent wrinkling or bagging of the stocking after a straightening of the leg subsequent to a bending operation. When bent, the additional strain transmitted to the stocking will be compensated by the elastic movement of the encircling band within itself and not by a creeping of the band along the leg or thigh.

The rubber used in the invention is referred to as being partially cured. The rubber referred to is the same type of rubber which is referred to in our co-pending application herein referred. The rubber has a rough surface, is porous, and has the capability of adhering to rubber of the same kind when brought into contact therewith. This kind of rubber is commonly known as crepe and its elasticity or stretchability differs much from cured rubber.

Experience has also shown in the use of this crepe rubber on hose supporters referred to herein, the elasticity is affected and sometimes varied by temperatures. When stretched it is slower to return to its normal stage than cured rubber, and under some climatic conditions a condition arises where the lining layers of rubber which are mounted on the elastic web having a tendency to turn the circular band inside out when removed from the leg of the wearer. The use of the cords of cured rubber serves to prevent these disadvantages and lend to the layers of crepe rubber additional elasticity which, while not permitting the layer of crepe rubber to stretch to greater length than they would ordinarily, serves to restore these layers of crepe rubber to their original length after being stretched. Experience has shown that the tendency of the circular band to turn inside out after being removed from the leg of the wearer is avoided by the use of the reinforcing elastic cords.

It is recognized that various changes and modifications may be made in the detail of the invention without departing from the spirit of it, and it is intended that such changes shall be embraced within the scope of the claims appending hereto and forming a part hereof.

What we claim is new is:

1. A hose supporter of the class described comprising a leg encircling band of elastic webbing; a layer of rubber mounted on and covering the inner surface of said band; a layer of rubber mounted on and covering the inner surface of said first mentioned layer of rubber; and elastic cords secured between said layers of rubber.

2. A hose supporter of the class described comprising a leg encircling band of elastic webbing; a layer of rubber mounted on and covering the inner surface of said band; a layer of rubber mounted on and covering the inner surface of said first mentioned layer of rubber; and elastic cords secured between said layers of rubber and extending parallel to the longitudinal edges thereof.

3. A hose supporter of the class described, comprising: a leg encircling band of elastic webbing; a lining of rubber on the inner surface of said band; and elastic cords embedded in said rubber on opposite sides of the medial line thereof and extending parallel to the edges thereof.

4. A hose supporter of the class described, comprising: a leg encircling band of elastic webbing; a lining of crepe rubber on the inner surface of said band; and elastic cords embedded in said rubber on opposite sides of the medial line thereof and extending parallel to the edges thereof.

5. A hose supporter of the class described, comprising: a leg encircling band of elastic webbing; a layer of crepe rubber mounted on and covering the inner surface of said band; a layer of crepe rubber mounted on the inner surface of said first mentioned layer of crepe rubber and of less width than said first mentioned layer; and elastic cords secured between said layers of crepe rubber and extending parallel to the edges thereof.

6. A hose supporter of the class described, comprising: a leg encircling band of elastic webbing; an outer layer of crepe rubber mounted on and covering the inner surface of said band; an intermediate layer of crepe rubber mounted on the inner surface of said outer layer; an inner layer of crepe rubber mounted on the inner surface of said intermediate layer; and elastic cords positioned between some of said layers and extending substantially parallel to the edges thereof.

THOMAS E. NEAR.
ETHEL SHERLOCK.